US011130500B2

(12) United States Patent
Fukumoto et al.

(10) Patent No.: US 11,130,500 B2
(45) Date of Patent: Sep. 28, 2021

(54) IN-VEHICLE ELECTRONIC CONTROL APPARATUS

(71) Applicant: HITACHI AUTOMOTIVE SYSTEMS, LTD., Hitachinaka (JP)

(72) Inventors: Kazuma Fukumoto, Ibaraki (JP); Yuki Horita, Tokyo (JP); Yuji Fukushima, Ibaraki (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 110 days.

(21) Appl. No.: 16/331,503

(22) PCT Filed: Sep. 13, 2017

(86) PCT No.: PCT/JP2017/032969
§ 371 (c)(1),
(2) Date: Mar. 7, 2019

(87) PCT Pub. No.: WO2018/066329
PCT Pub. Date: Apr. 12, 2018

(65) Prior Publication Data
US 2019/0193748 A1    Jun. 27, 2019

(30) Foreign Application Priority Data

Oct. 3, 2016    (JP) .............................. JP2016-195351

(51) Int. Cl.
*G06F 7/00*    (2006.01)
*B60W 50/06*    (2006.01)
(Continued)

(52) U.S. Cl.
CPC ............ *B60W 50/06* (2013.01); *B60W 40/09* (2013.01); *B60W 40/105* (2013.01); *G06F 12/00* (2013.01);
(Continued)

(58) Field of Classification Search
CPC .... B60W 50/06; B60W 40/09; B60W 40/105; G06F 16/284; G06F 12/00; G06F 12/0292
(Continued)

(56) References Cited

U.S. PATENT DOCUMENTS

2008/0031587 A1*  2/2008 Chen ...................... H04N 5/783
                                                              386/248
2008/0091691 A1   4/2008 Tsuji
(Continued)

FOREIGN PATENT DOCUMENTS

JP    H8-161244 A    6/1996
JP    2001-147122 A  5/2001
(Continued)

OTHER PUBLICATIONS

Extended European Search Report issued in corresponding European Patent Application No. 17858168.2 dated Apr. 8, 2020.
(Continued)

*Primary Examiner* — Isaac M Woo
(74) *Attorney, Agent, or Firm* — Foley & Lardner LLP

(57) ABSTRACT

The purpose of the present invention is to provide an in-vehicle database which enables frequently updated real-time information to be read at high speed from a plurality of sets of input information, and an in-vehicle control apparatus having the in-vehicle database.
The in-vehicle electronic control apparatus comprises: a data collection unit which acquires a plurality of pieces of data; a data storage unit which stores the plurality of pieces of data; and a table generation unit which generates a table having storage place identification information for identifying a storage place for the piece of data matching a predetermined data condition among the pieces of data stored in the data storage unit.

10 Claims, 11 Drawing Sheets

(51) Int. Cl.
*G06F 12/02* (2006.01)
*B60W 40/105* (2012.01)
*G06F 16/28* (2019.01)
*B60W 40/09* (2012.01)
*G06F 12/00* (2006.01)

(52) U.S. Cl.
CPC ........ *G06F 12/0292* (2013.01); *G06F 16/284* (2019.01)

(58) Field of Classification Search
USPC .................................................. 707/600–899
See application file for complete search history.

(56) References Cited

U.S. PATENT DOCUMENTS

| | | | |
|---|---|---|---|
| 2012/0221216 A1 | 8/2012 | Chauncey et al. | |
| 2015/0332519 A1* | 11/2015 | Hiura ................... | G08G 1/0133 701/33.4 |

FOREIGN PATENT DOCUMENTS

| | | |
|---|---|---|
| JP | 2003-081039 A | 3/2003 |
| JP | 2007-034878 A | 2/2007 |
| JP | 2014-041434 A | 3/2014 |
| WO | WO-2006/046669 A1 | 5/2006 |

OTHER PUBLICATIONS

W. Jenkins, "Real-Time Vehicle Performance Monitoring with Data Integrity", Mississippi State University, Oct. 2006, fifty-seven (57) pages.
International Search Report with English translation and Written Opinion issued in corresponding application No. PCT/JP2017/032969 dated Jan. 16, 2018.
Office Action issued in corresponding Japanese Patent Application No. 2018-543812 dated Oct. 8, 2019.

* cited by examiner

FIG. 2

| ADDRESS | DATA TYPE | TIME | DATA ID | DATA | |
|---|---|---|---|---|---|
| 100 | VEHICLE | 00:01 | 1 | 60km/h | 10m |
| 101 | PERSON | 00:03 | 1 | 3km/h | 15m |
| 102 | VEHICLE | 00:05 | 2 | 100km/h | 8m |
| 103 | VEHICLE | 00:08 | 3 | 60km/h | 14m |
| 104 | PERSON | 00:11 | 2 | 5km/h | 11m |
| 105 | VEHICLE | 00:14 | 4 | 0km/h | 20m |

IN-VEHICLE ELECTRONIC CONTROL APPARATUS

TECHNICAL FIELD

The present invention relates to an in-vehicle electronic control apparatus

BACKGROUND ART

The number of sensors mounted in a vehicle is increased, and a data amount handled in the vehicle is also increased. In addition, detailed map data which is used in a developed driving support and an automatic driving technique is also used in control of the vehicle. In addition, the communication between vehicles, and communication data of a traffic management mechanism also need to be handled in an in-vehicle electronic control apparatus. Further, a data amount used in software executed by the in-vehicle electronic control apparatus is also increased as the capacity of the in-vehicle electronic control apparatus is increased.

If these pieces of data are not managed systematically, the data required in the application handling the data is not managed to be processed, and the processing delay is likely to occur. Further, in an environment in which a processing time is scheduled in advance such as an application operating in the in-vehicle electronic control apparatus, a predetermined process such as transferring data must be completed within a designated processing time. However, in a case where the data amount handled between the applications is increased, it is considered that all the target data is not completely transferred within the designated processing time. In particular, in a case where a very urgent one influencing on the driving is not included in the transferred data, it can be considered that the driving is influenced.

Therefore, it is possible to suppress a delay in the processing times by narrowing down the transferring data considered to be necessary for the driving. As a way like the above configuration, there is a method of giving priority to important data to send the data first so as to securely handle the data with priority.

PTL 1 discloses a data transmission method in which a plurality of data processing systems perform communication. The data is transferred with good data transmission efficiency while the priority of data is considered to some degree. In particular, data needed to be handled with urgency is transferred with priority to transfer the data to cope with the urgent situation. In PTL 1, there is proposed a method of determining a priority in advance according to the type of handling data, and transferring the data containing information such as a failure or an abnormality with priority.

CITATION LIST

Patent Literature

PTL 1: JP 8-161244 A

SUMMARY OF INVENTION

Technical Problem

In the developed driving support and the automatic driving, it is really hard to select data required in driving in the method of determining of the priority for each data type and transferring the data as disclosed in PTL 1. The reason is because the priority of the data handled in the vehicle is necessarily determined in consideration of plurality of pieces of data such as a relative distance and a relative position with respect to other vehicle depending on a driving scene. In addition, even in the data type such as the same relative distance, there is a need to transfer the relative distance first which is located close. At this time, there is a need of a process of arranging data from among a target data group. In this way, the in-vehicle electronic control apparatus has a unique problem in the vehicle, and is not easy to be solved with the method of PTL 1.

In addition, in PTL 1, there is required a member to transfer data with priority on the basis of the predetermined priorities. However, the vehicle data differs in the acquisition conditions according to the driving scene such as a high speed region and a low speed region. Therefore, it is not possible to determine data which is really put first only by assigning the predetermined priorities, and a high speed data acquisition is not possible to be realized.

An object of the invention is to provide an in-vehicle electronic control apparatus which can realize a high handling of data which is required in control.

Solution to Problem

The in-vehicle electronic control apparatus according to the invention includes a data collection unit which acquires a plurality of pieces of data, a data storage unit which stores the plurality of pieces of data, and a table generation unit which generates a table having storage place identification information for identifying a storage place for the piece of data matching a predetermined data condition among the pieces of data stored in the data storage unit.

Advantageous Effects of Invention

According to the invention, it is possible to realize a high speed handling of data which is required in control.

BRIEF DESCRIPTION OF DRAWINGS

FIG. 2 is a diagram illustrating a data storage format.

DESCRIPTION OF EMBODIMENTS

Hereinbelow, a vehicle information management system according to embodiments of the invention will be described.

First Embodiment

Figure 1:
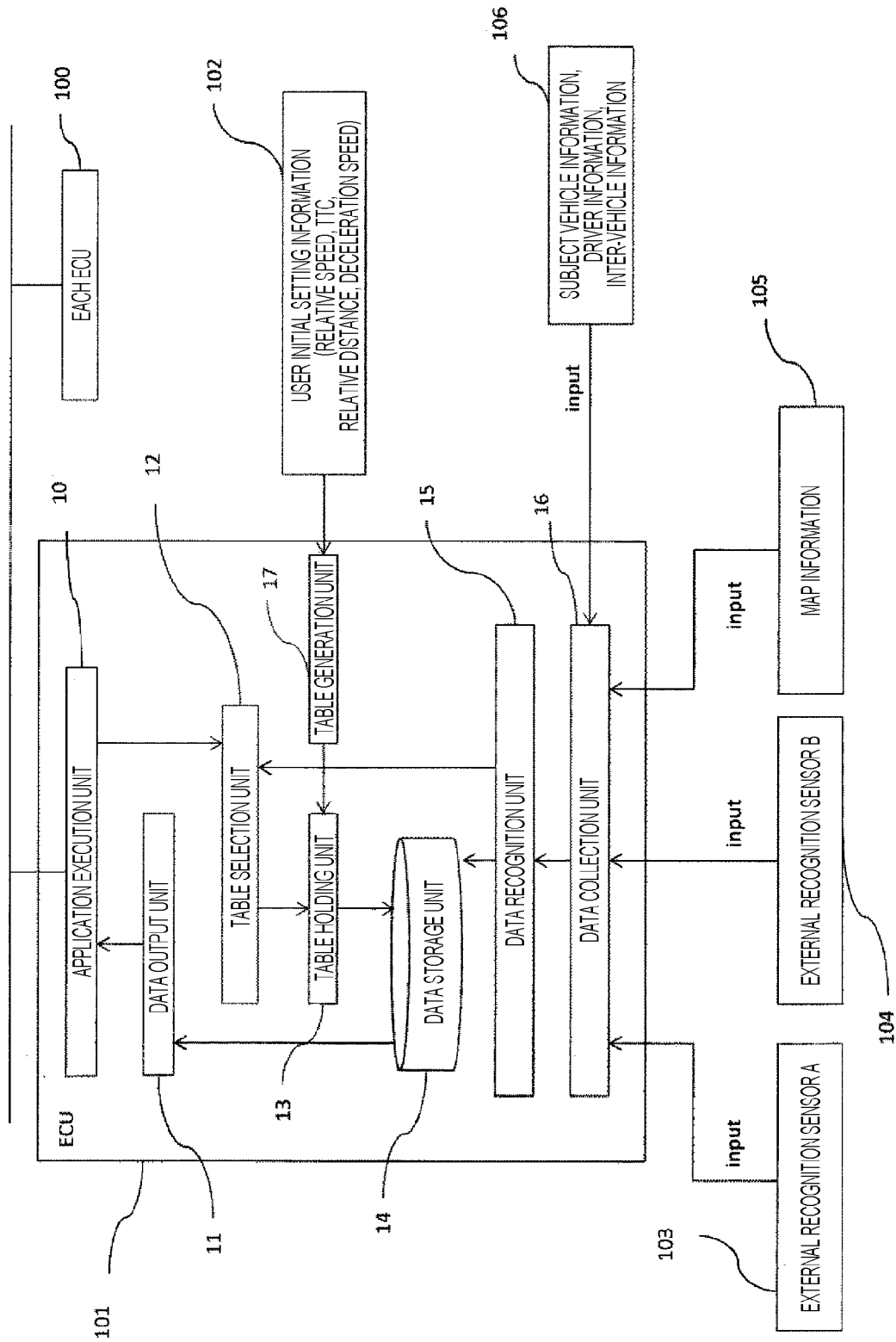
FIG. 1 is a diagram illustrating a configuration of a system.

As illustrated in FIG. 1, an in-vehicle electronic control apparatus 101 acquires an external recognition sensor, map information, subjective vehicle information, driver information and vehicle-to-vehicle information, and transmits the data to each in-vehicle electronic control apparatus.

The description will be given about a series of processes of receiving information to the in-vehicle electronic control apparatus 101 from external recognition sensors and the map information denoted by 103, 104, and 105 which are connected to the in-vehicle electronic control apparatus 101.

FIG. 1 is configured by the in-vehicle electronic control apparatus 101, an in-vehicle electronic control apparatus group 100 connected to the in-vehicle electronic control apparatus 101, the external recognition sensors 103 and 104, and map information 105. The in-vehicle electronic control apparatus 101 includes an application execution unit 10, a data output unit 11, a table selection unit 12, a table generation unit 17, a table holding unit 13, a data storage unit 14, a data recognition unit 15, and a data collection unit 16. These components will be collectively called a data management system.

Figure 4:
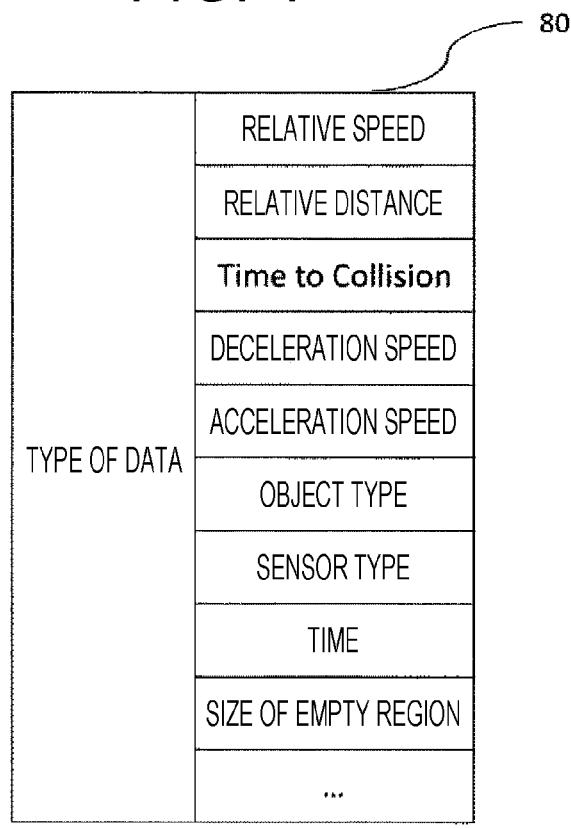
FIG. 4 is a diagram for describing a type of data to be held in a table.

After the system of the in-vehicle electronic control apparatus is activated, the table generation unit 17 generates a table according to a plurality of different data conditions on the basis of user initial setting information 102 which is set by a user in advance. It is assumed that the table to be generated is set with at least one of a relative distance, a relative speed, a TTC, a deceleration speed, and a type of a stationary object and a moving object existing within a detection range of the sensor. The generated table is information related mainly to a driving vehicle. In this embodiment, a table 80 of the type illustrated in FIG. 4 is considered. However, actually not only the table 80 of FIG. 4, but also user's various desired tables may be set. In addition, an arranging (ascending and descending) order of data in the table and setting information indicating how many pieces of storage place identification information is stored in each table are assigned at the same time. In the table generation unit 17, a table is generated on the basis of the user initial setting information 102 which is assigned in Step 60 (Step 61). Specifically, the table generation unit 17 secures memory regions as many as the designated tables, and stores the tables in the table holding unit 13.

Next, the description will be given about a process flow after collecting data from the in-vehicle sensors up to storing the data in the data storage unit 14. The structure illustrated in FIG. 2 is employed as a data structure 20 in the data storage unit. Further, the data storage unit 14 may be called a database. External recognition sensor information indicated by 103 and 104, the map information of 105, and subject vehicle information of 106, driver information, or the vehicle-to-vehicle information are acquired by the in-vehicle electronic control apparatus through the data collection unit 16. Further, information received by the data collection unit 16 is transferred to the data recognition unit 15. The data recognition unit 15 identifies the type of the acquired recognition information, and stores the data to the data storage unit 14.

The acquired data is used by the data recognition unit 15 to recognize a driving mode, a driving scene, an executed application, a priority, a security, and a usage frequency.

Figure 3:
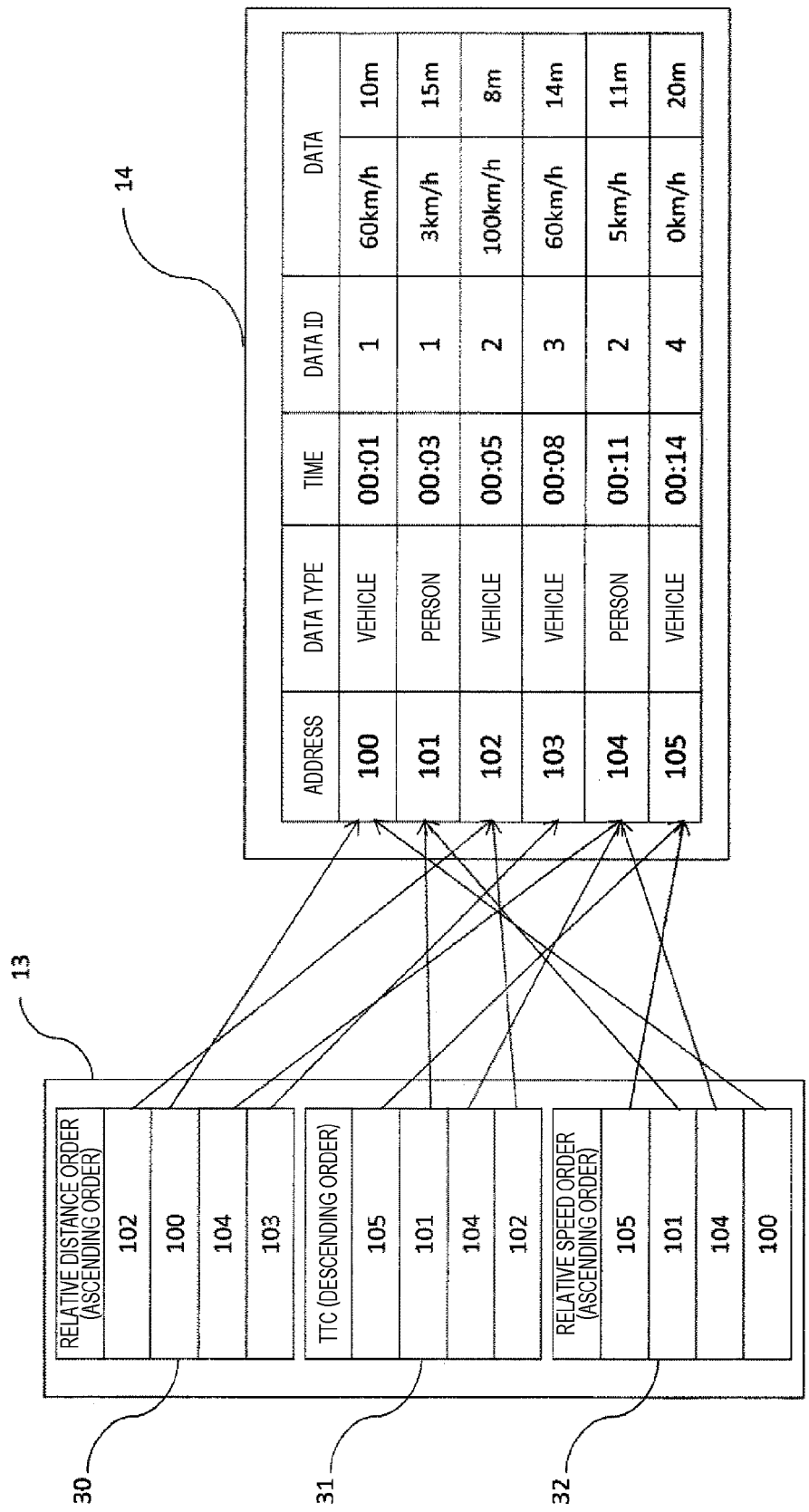
FIG. 3 is a diagram for describing a relation between a data storage unit and a table holding.

The acquired data is recognized about a present driving situation and processed in the data recognition unit 15, and then stored in the data storage unit 14. The stored data is associated with the table generated by the table generation unit 17 according to the data condition. The relation between the table generated by the table generation unit 17 and the data storage unit 14 is illustrated in FIG. 3. The table generation unit 17 stores the storage place identification information which specifies a storage place of the data stored in the data storage unit 14. Further, the storage place identification information is address information in this embodiment, but not limited to the address information as long as the storage place of data can be specified.

In addition, for example, in the user initial setting information, in a case where a setting of holding a pedestrian data (object type) is assigned, only the pedestrian information can be acquired with priority. Further, a table of time is stored. In a case where a descending order is set, the latest data can be acquired with priority.

In addition, data obtained from a camera for recognizing the outside during the night driving is normally low in the recognition rate of the acquired object compared to the data obtained from the laser radar installed in the same way depending on the sensitivity of the sensor. In such a situation, the information of the laser radar is preferably acquired with priority to the data from the camera. Therefore, such a driving situation is assigned to the identification information selection unit 12, so that the data of the laser radar can be acquired with priority.

In a case where the external recognition sensor information or the map information is added to the data collection unit 16, each table held in the table holding unit 13 is updated.

Figure 9:
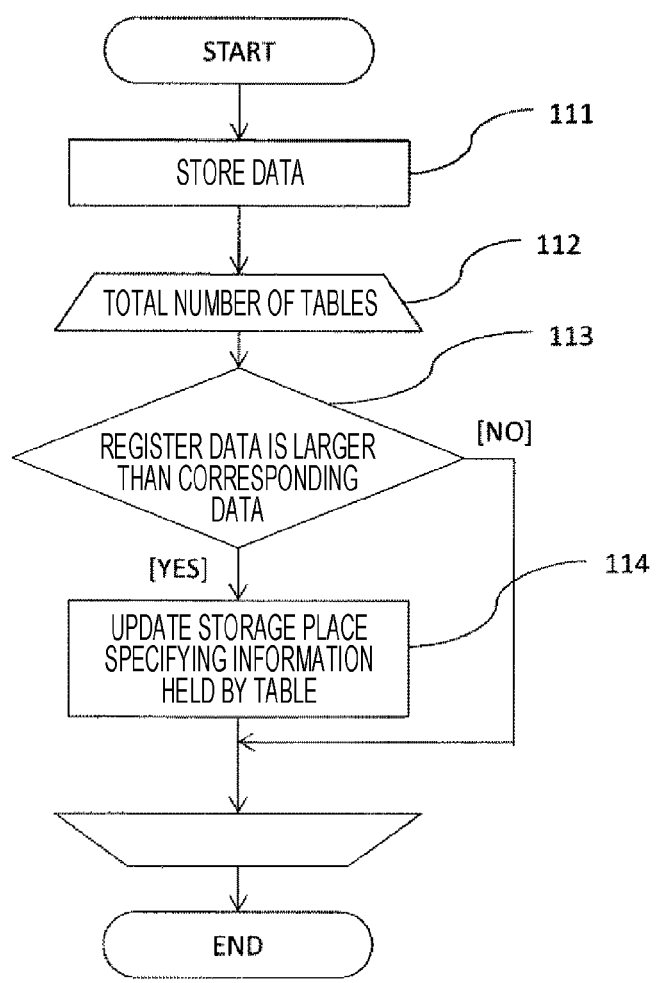
FIG. 9 is a diagram for describing a table updating.

In a case where sensor data is newly acquired, the acquired data is subjected to the process in the data recognition unit 15 after being subjected to the data collection unit 16, and registered in the data storage unit 14 (Step 111 of FIG. 9). After storing the data, an index table is updated. In this embodiment, all the index tables are updated at a time. Therefore, in Step 113, the acquired data is compared to the data in the index table. If there is data to be updated, the storage place identification information of the data stored in the table is updated (Step 114).

Figure 10:
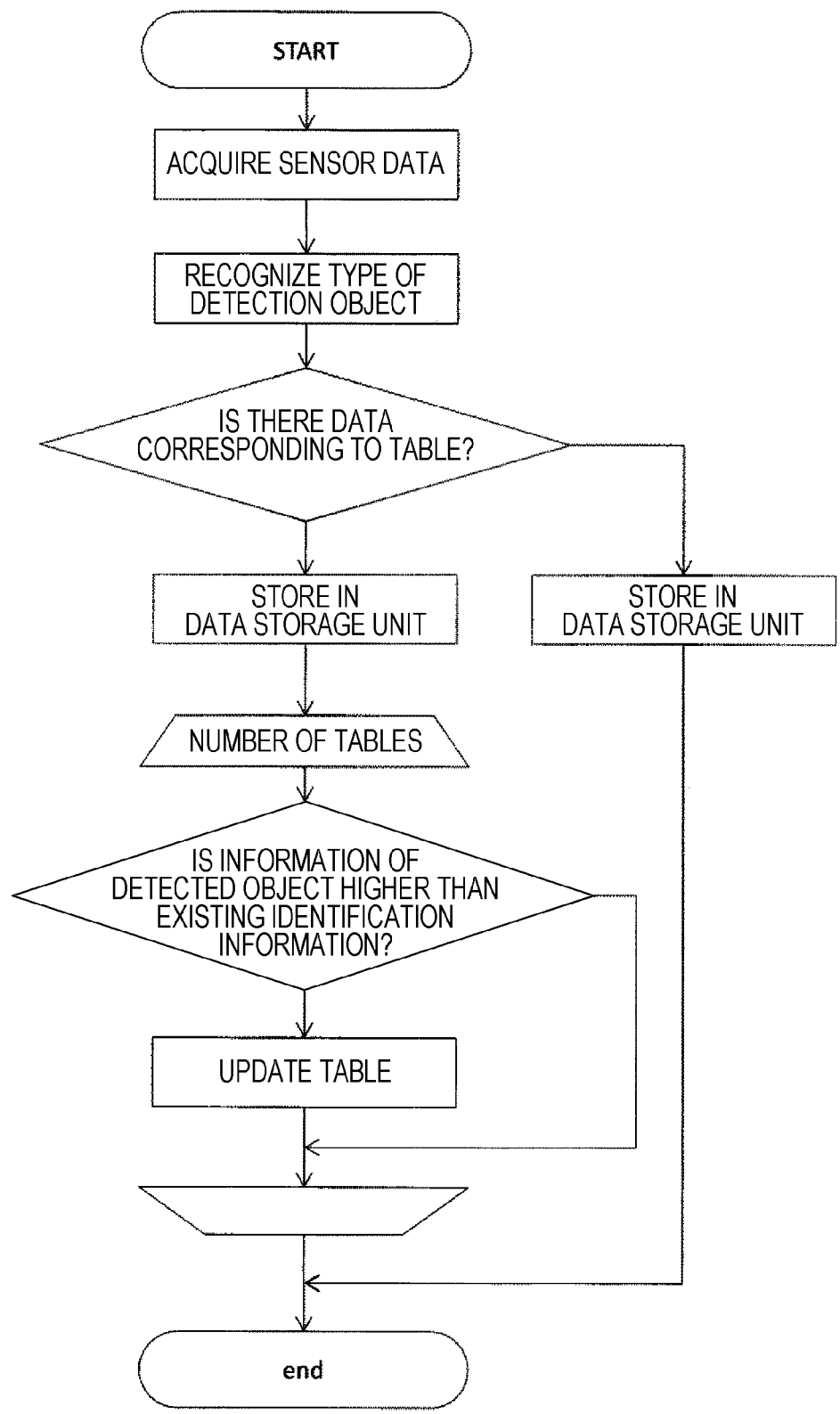
FIG. 10 is a diagram for describing a table updating.
Figure 11:
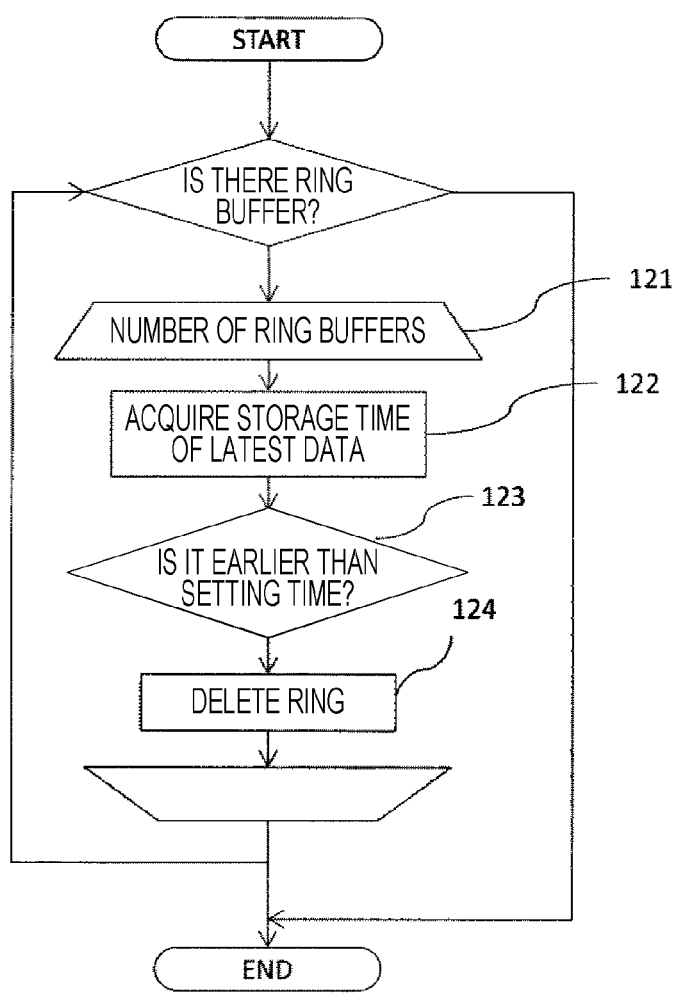
FIG. 11 is a diagram for describing erasing data without updating for a predetermined period.

In addition, as illustrated in Step 112, the process is repeatedly performed as many as the number of tables, so that all the tables can be updated. Further, the details of Step 114 related to the table update is the same as illustrated in FIG. 10, and the detailed description will be omitted.

The application execution unit 10 calculates values necessary for recognition, determination, and control on the basis of the external recognition sensor information and the map information which are input to the in-vehicle electronic control apparatus 101, and sends the result to the in-vehicle electronic control apparatus group 100.

In practice, the data stored in the data storage unit 14 is acquired to calculate these values. A process that the application execution unit 10 acquires the external recognition sensor information acquired by 103 and 104 from the data storage unit 14 is illustrated. The application execution unit 10 presents a retrieval condition of the data to a table selection unit 12. It is possible to designate an acquisition range related to the type of a desired target object, the number of acquisitions, and an object. Specifically, it is possible to acquire information of vehicles existing within a radius of 100 m from the subject vehicle in an order of distance near the subject vehicle. When such a retrieval request is assigned from the application execution unit, the retrieval request of the data of the application execution unit 10 is analyzed by the table selection unit 12. In the table selection unit 12, the acquired table is determined on the basis of the recognition result of the data recognition unit 15.

Figure 8:
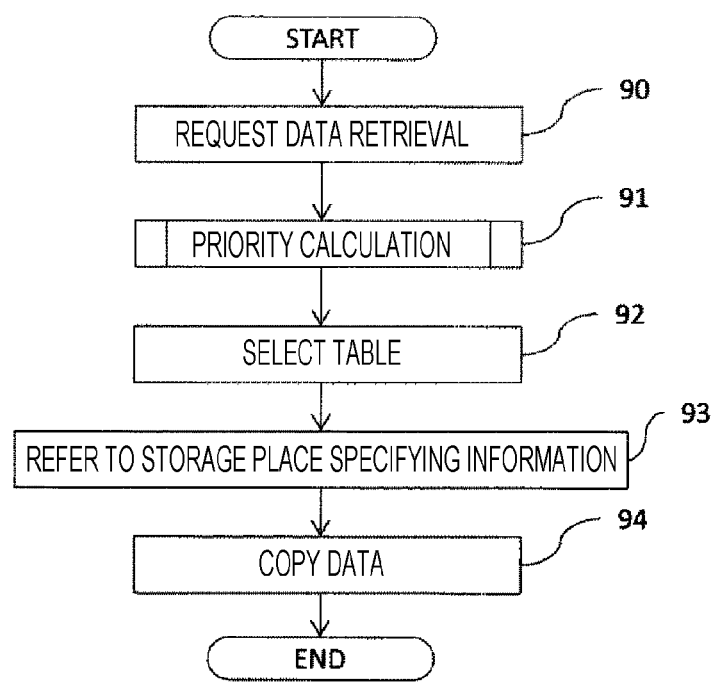
FIG. 8 is a diagram for describing a process from selecting a table to be used in this embodiment up to copying data.

For example, in a case where there is an acquisition request for the data as illustrated in Step 90 of FIG. 8 with respect to the table selection unit 12 from an application which selects a driving mode with emphasis on the fuel efficiency of the vehicle, the priority is calculated first as illustrated in Step 91 of FIG. 8, and a table suitable to the present driving mode is selected. In Step 92, a table to be used is selected on the basis of the calculated priority. In a case where the table holding unit 13 is stored in a plurality of tables as illustrated in 30, 31, and 32, a table focusing on the relative distance with respect to a preceding vehicle is acquired with priority if it is in a normal driving mode. However, in a case where it is determined that it is in the driving mode with emphasis on the fuel efficiency of the vehicle in the table selection unit 12, a table focusing on a relative speed 32 of the preceding vehicle is acquired with priority.

As illustrated in FIG. 3, the storage place identification information of the corresponding data in the data storage unit is added in each table. Therefore, when the storage place identification information is referred in Step 93, only the corresponding data can be acquired from the data storage unit only referring to the storage place identification information without retrieving all the data in the data storage unit. In the above example, the actual data is copied from the data storage unit 14 to the application with reference to the address on the memory of the table 32 in the process of Step 94.

In addition, when an abnormality is detected in the subject vehicle, only a minimum amount of required data is sent. As a specific example, in the data recognition unit 15, in a case where information indicating an abnormality is detected, a notification of detecting an abnormality is sent to the table selection unit 12. The table selection unit 12 determines a table to be acquired on the basis of the information related to the abnormality and the information assigned in advance, and copies the data in response to a request of the application execution unit.

By the way, in a case where an object moving at high speed is handled while the ambient environment is changing, it is important to predict and estimate the changing of the ambient environment including the subject vehicle after the present time as well as the information at the present time in order to support the automatic driving and a developed driving support. In a case where an artificial intellectual technology, a mechanical learning, and a statistic processing are operated in the in-vehicle electronic control apparatus to perform prediction and estimation, the past information is based. Therefore, it is also important that the past information of the subject vehicle and the target object is suitably managed. In addition, when performing the prediction and the estimation, it is important to predict on the same target object. Therefore, it is important to suitably link the past and current information.

Figure 5:
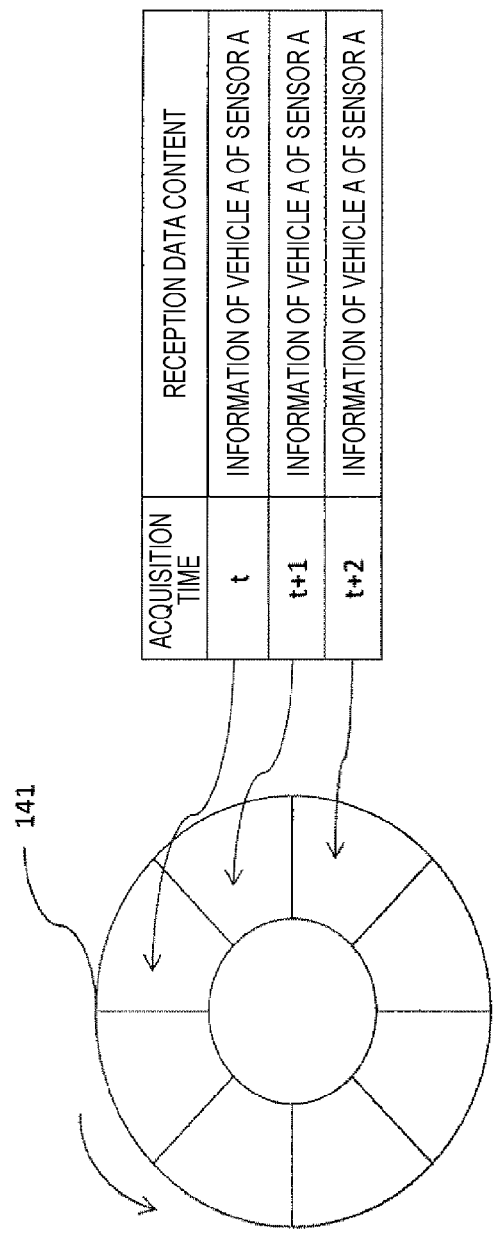
FIG. 5 is a diagram for describing a method of managing data in a ring buffer structure.
Figure 6:
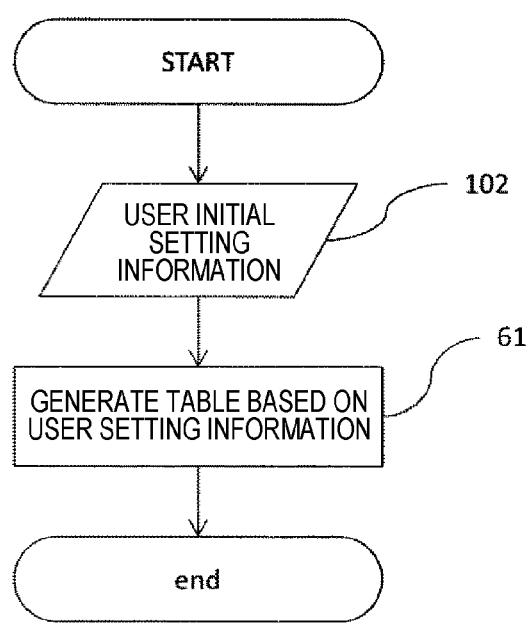
FIG. 6 is a diagram for describing a table creation.

Thus, next, the description will be given about the management of data using a ring buffer 141 and a suitable management of the past information. In the data storage unit 14, a ring buffer configuration is employed. The memory in the buffer region is segmented at a certain region size. In each segment, head address information of the adjacent regions is transferred. In addition, the last address in the memory is set to indicate the head address, so that the memory is disposed in a ring shape. At this time, in a case where the data of the same target object is continuously transmitted from the same sensor or the same application, the data is stored in a direction of ring over time. In practice, as illustrated in 141 of FIG. 5, the data is managed at every time when the data is acquired. Since such as a ring shape data is stored, the data can be overwritten in an order of older data. It is possible to suppress the occurrence of the overflow of the memory. In addition, since the same target object is managed in the same ring shape, it is possible to ring and manage the target objects. Using a difference from the past data or the past data, a trace of the subject vehicle or other vehicle a few second away is easily guessed. Further, the same ring shape is used for the retrieval, so that the retrieval is improved in efficiency.

In addition, in Step 122, an acquisition time of the latest stored data is acquired. In a case where the acquisition time of the latest stored data among the data stored in a certain ring buffer is acquired earlier than a predetermined limit time (Step 123), the update of the data is not performed but determined as unnecessary, and discarded (Step 124). Such a process is repeatedly performed as many as the number of ring buffers (Step 121), and thus the memory region is managed efficiently without storing the old data for a long time.

In addition, in the table selection unit 12, while not directly contained in the sensor data, data which can be newly defined by combining some pieces of data is calculated by the data collection unit 16 on the basis of a predetermined calculation equation designated by the user, and stored in the database.

For example, a time to collision (TTC) which indicates a collision time can be obtained by dividing the relative distance by the relative speed. However, the TTC data is not output by all the sensors, but must be appropriately generated by the application. Then, the time to collision (TTC) is calculated by the data recognition unit 15 at the time of data acquisition, and stored in the data storage unit 14.

Specifically, the acquired data after data collection is analyzed by a data length. In a case where the data corresponds to the user initial setting information, the data is transferred to the next process in the data generation process of Step 71 after the TTC value is calculated.

At this time, the newly created data can also be used as identification information. There is no need to perform calculation whenever the data is acquired. Therefore, it is possible to realize that the data is acquired with efficiency and at high speed.

Various types of data acquired by the data collection unit 16 such as the external recognition sensors connected to the in-vehicle electronic control apparatus 101 are different in formats and units of data depending on hardware and software. It is important that the data handled by the table holding unit 13 is arranged in order according to the same standard. However, in a case where the formats and the units of data differ, the application execution unit 10 must change programs for each data. Therefore, in this embodiment, the changing process of the formats and the units of data is performed in advance. The flow is illustrated in FIG. 7, and the details of the description will be omitted.

As described above, the data used in the vehicle differs in formats and units of data depending on the in-vehicle sensors and the applications. Specifically, there are sensors which display speeds and distances in miles, kilometers, and centimeters. In this way, it is important to compare the data having different formats in a common unit. In this embodiment, the data is processed and converted in Step 72 in advance on the basis of the user initial setting information 102. The information related to the change is converted in advance on the basis of the information designated by the user.

Figure 7:
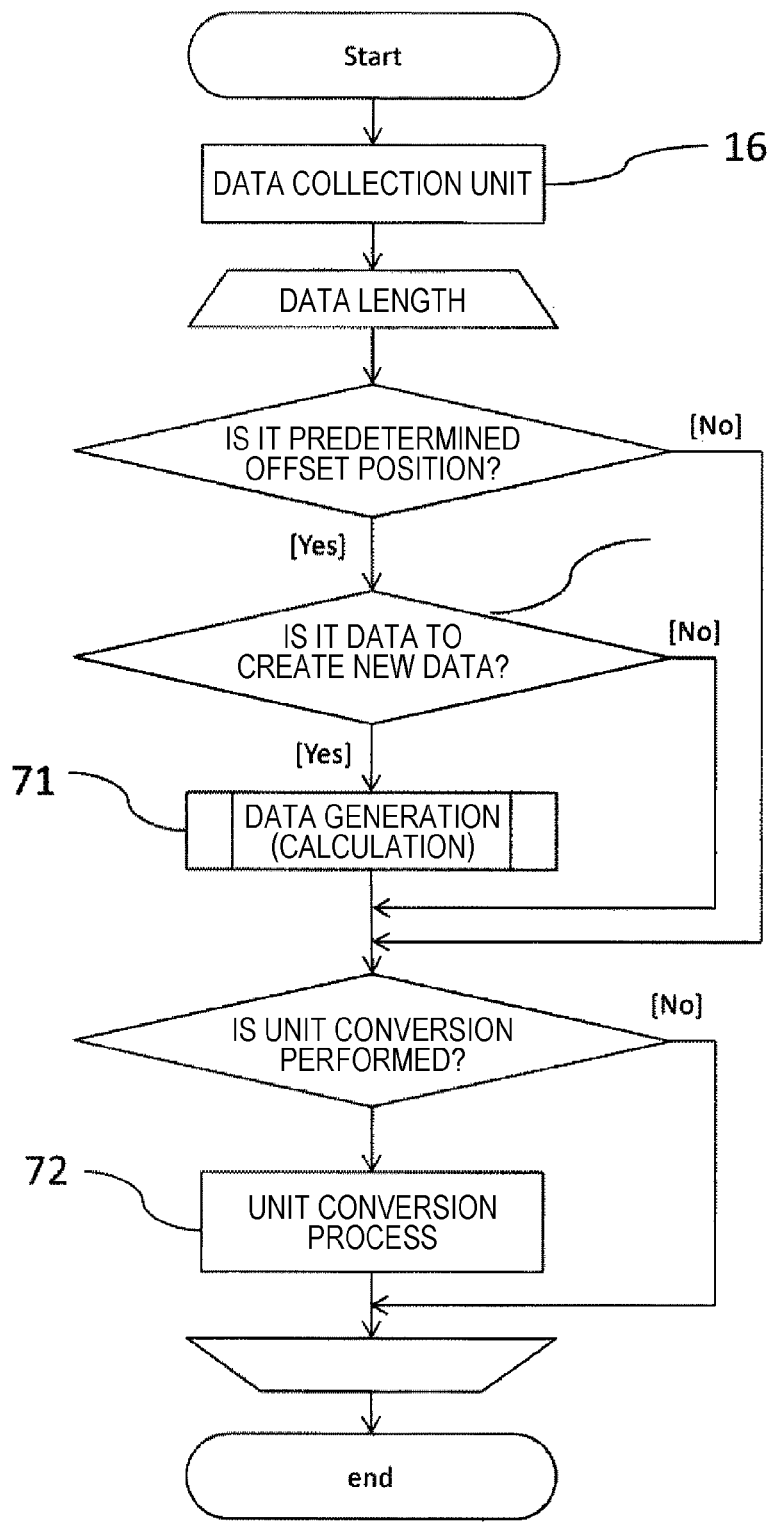
FIG. 7 is a diagram for describing a data structure after data collection.

After the data is collected in the data collection unit 16 as illustrated in FIG. 7 (Step 16), the data is converted in Step 71 according to the user initial setting information 102. In the user initial setting information 102, in a case where the unit of data related to the speed received from a stereo camera is a mile under a condition that miles are set to be converted into kilometers, miles are converted into kilometers according to the setting in Step 72 after receiving the data.

As described above, according to the in-vehicle electronic control apparatus of this embodiment, even in a case where the data amount to be managed by the in-vehicle electronic control apparatus is increased in the developed driving support and the automatic driving, the table is linked to the data actually stored in the data storage unit. Further, the tables can be selected according to the driving mode, the driving scene, the executed application, the priority, the security, and the usage frequency. Further, the tables are stored with the addresses of the target data, so that the desired data can be accessed at high speed, and it is possible to suppress a delay of data transfer and missing.

REFERENCE SIGNS LIST

10 application execution unit
11 data output unit
12 table selection unit
13 table holding unit
14 data storage unit
15 data recognition unit
16 data collection unit
17 table generation unit
80 table
100 in-vehicle electronic control apparatus group
101 in-vehicle electronic control apparatus
102 user initial setting information
103, 104 external recognition sensor
105 map information
106 subject vehicle information, driver information, vehicle-to-vehicle information
141 ring buffer

The invention claimed is:

1. An in-vehicle electronic control apparatus, comprising:
   a data collection unit which acquires a plurality of pieces of data;
   a data storage unit which stores the plurality of pieces of data using a ring buffer configuration such that the plurality of pieces of data are stored and then overwritten based on at least an acquisition time associated with acquisition of each of the plurality of pieces of data by the data collection unit;
   wherein the data storage unit is configured to determine a number of ring buffers and the acquisition time of each of the plurality of pieces of data by the collection unit, wherein the data storage unit is configured to determine that an update is unnecessary in response to determining that the acquisition time is earlier than predetermined limit time, and wherein the data storage unit is configured to repeat the determination that an update is unnecessary based on the number of ring buffers; and
   a table generation unit which generates a table having storage place identification information for identifying a storage place for the piece of data matching a predetermined data condition among the pieces of data stored in the data storage unit.

2. The in-vehicle electronic control apparatus according to claim 1,
   wherein the table generation unit generates a plurality of tables which correspond to a plurality of different data conditions.

3. The in-vehicle electronic control apparatus according to claim 2, further comprising:
   a table selection unit which selects a table on the basis of a predetermined table selection condition from among the plurality of tables,
   wherein the predetermined table selection condition is set on the basis of at least one of a driving scene, an executed application, a priority, a security, and a usage frequency.

4. The in-vehicle electronic control apparatus according to claim 3, wherein the predetermined table selection condition is further set on the basis of a driving mode, wherein the driving mode is a normal driving mode or a fuel efficiency mode.

5. The in-vehicle electronic control apparatus according to claim 3, wherein the table selection unit selects the table in response to receiving an indication of a detected abnormality.

6. The in-vehicle electronic control apparatus according to claim 2, further comprising:
   a recognition unit which performs a recognition process on the data,
   wherein the predetermined table selection condition is set on the basis of a result of the recognition process.

7. The in-vehicle electronic control apparatus according to claim 6, wherein the data recognition unit calculates a time to collision (TTC) based on the plurality of pieces of data, the plurality of pieces of data includes a relative distance and a relative speed, and wherein the calculated TTC is stored in the data storage unit.

8. The in-vehicle electronic control apparatus according to claim 1,
   wherein the predetermined data condition includes a type of data.

9. The in-vehicle electronic control apparatus according to claim 8,
   wherein the type of data is at least one of a relative distance, a relative speed, a time to collision (TTC), and a deceleration speed.

10. The in-vehicle electronic control apparatus according to claim 1, wherein the table generation unit generates the table based on initial setting information from a user.

* * * * *